United States Patent [19]
Goddard

[11] 3,926,808
[45] Dec. 16, 1975

[54] SEWAGE TREATMENT SYSTEM

[76] Inventor: Clarence C. Goddard, 902 21st St., N.W., Albuquerque, N. Mex. 87104

[22] Filed: Sept. 7, 1973

[21] Appl. No.: 395,253

[52] U.S. Cl. ................. 210/195; 210/202; 210/220
[51] Int. Cl.² ........................................... C02C 1/08
[58] Field of Search ............................ 210/2–8, 11, 210/14, 15, 170, 194, 195, 196, 197, 221, 220, 202

[56] References Cited
UNITED STATES PATENTS

| | | | |
|---|---|---|---|
| 2,815,943 | 12/1957 | Lamb | 210/221 X |
| 3,271,304 | 9/1966 | Valdespino et al. | 210/14 X |
| 3,385,786 | 5/1968 | Klock | 210/14 X |
| 3,517,810 | 6/1970 | Beer | 210/5 X |
| 3,618,779 | 11/1971 | Goodman | 210/195 |
| 3,662,890 | 5/1972 | Grimshaw | 210/195 |
| 3,714,036 | 1/1973 | Slater | 210/195 X |
| 3,724,664 | 4/1973 | Lemberger et al. | 210/170 X |
| 3,760,946 | 9/1973 | Boler | 210/14 X |

Primary Examiner—John Adee
Assistant Examiner—Robert H. Spitzer
Attorney, Agent, or Firm—William C. Bowers

[57] ABSTRACT

This is a system for sewage treatment relying on oxidation through aeration, aerobic bacterial action on nutritional matter, and the natural effects of ultraviolet rays emitted by the sun. Pre-fabricated modules will be supplied for various sized units and specially designed units are contemplated for larger installations.

3 Claims, 6 Drawing Figures

SEWAGE TREATMENT SYSTEM

BACKGROUND OF THE INVENTION

In the development of the United States, "Chick sales" specials were installed in nearly every community. Further development introduced collective sewer systems discharging untreated sewage into available rivers or streams. Communities 10 to 50 miles below drew their water supplies from the same stream and used that water without treatment. The natural action of oxidation, ultraviolet rays and aerobic participation made the water potable. Increased population concentration made this system continually more unacceptable. The communities downstream were forced to install water treatment systems to make the river water potable. The Illinois River became the Chicago Sewer. Municipalities developed elaborate sewage treatment plants which became overloaded and released an effluent which contaminated the natural waters or rivers into which they were released. A search of existing patents reveals:

D'Aragon U.S. Pat. No. 3,489,396 describes a venturi-aspirator system for meeting B.O.D. In naturally flowing streams Welles U.S. Pat. No. 3,511,864 shows an aeration system. Valdespino U.S. Pat. No. 3,271,304 shows a venturi aspiration system for use in a "sewage treatment system." Budd, U.S. Pat. No. 3,470,091 shows a process for in situ treatment of polluted streams, rivers and canals. MacLaren, U.S. Pat. No. 2,852,140 shows a three compartment treatment system utilizing anaerobic bacterial treatment aeration, and fallback of sludge, for individual residences.

I cannot see that any of the prior art anticipates a completely aerobic, recirculating, oxidizing, and ultraviolet treatment system as is submitted here.

SUMMARY

This invention proposes the introduction of raw sewage into influent, recirculation, aeration channels with impervious linings, seeded with aerobic bacteria which feed on the nutritious sewage, the release of a part of the fluid into effluent aeration channels, the diversion of a part to a recirculating sump from which it is pumped through a venturi tube aspirating device thus adding air to the incoming sewage, diluting it and seeding it with aerobic bacteria, and in addition further diluting the incoming sewage with clarified water from the final effluent aeration channel. The effluent passes over a weir protected by a scum skimmer, through a discharge trough, either to natural drainage or into a collecting tank reservoir for use in irrigation or lawn sprinkler operation. Fresh water may be injected into the system, preferably at the recirculation sump, if the sewage effluent is insufficient to provide for necessary intermittent irrigation or lawn sprinkling. It is contemplated that pre-cast or pre-formed modules would be produced for various requirements.

THE DRAWINGS

PREFERRED EMBODIMENT OF THE INVENTION

Figure 1:
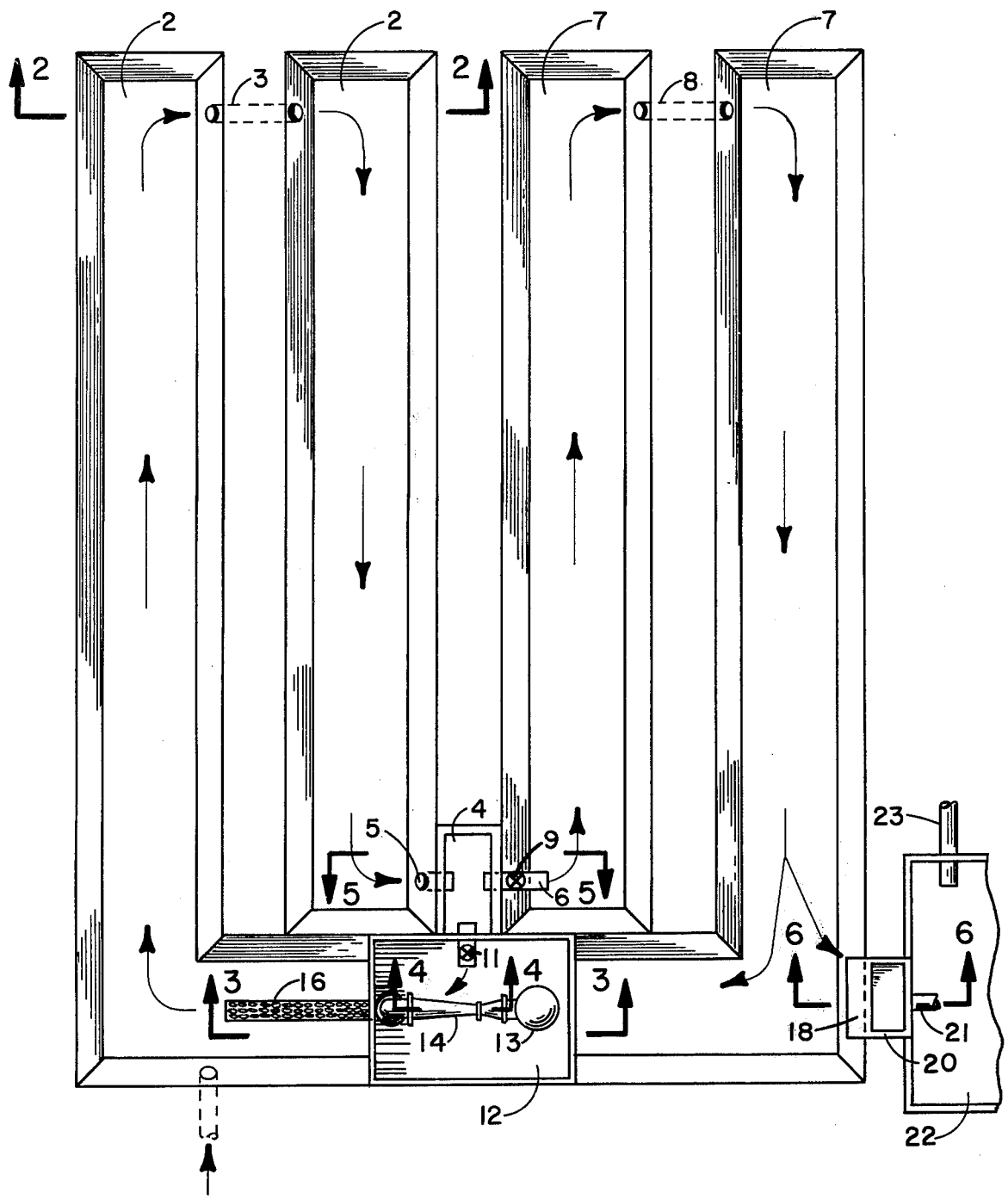
FIG. 1 is a plan view of the entire system with any and all covers removed.
Figure 2:
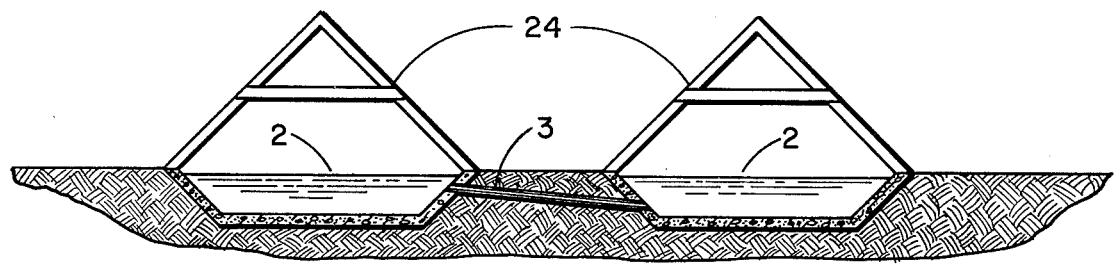
FIG. 2 is a section cut on lines 2—2 on FIG. 1. A similar section cutting the effluent aeration channels would be identical.
Figure 3:
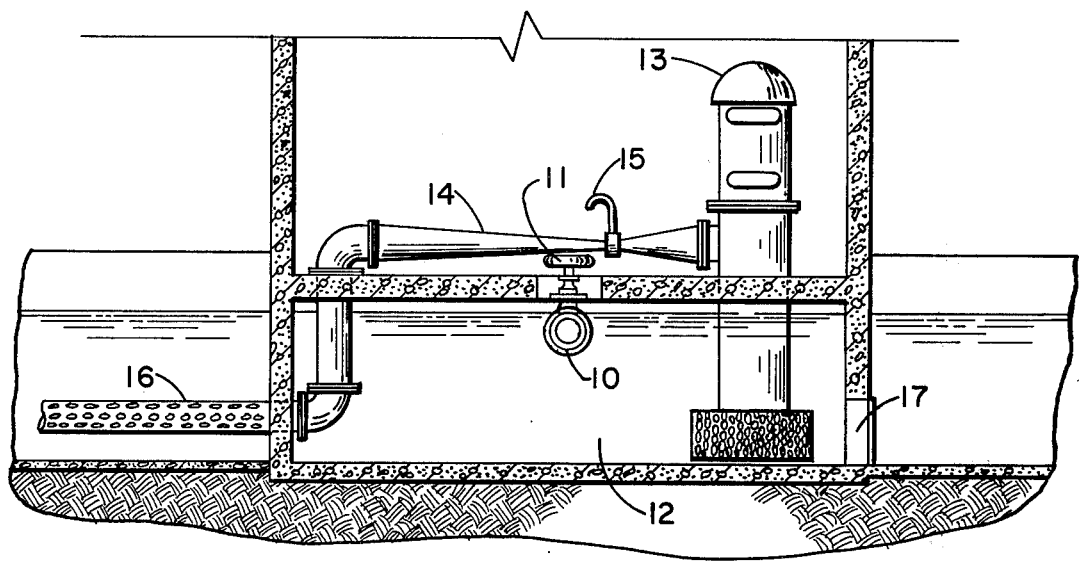
FIG. 3 is a sectional elevation cut on lines 3—3 of FIG. 1.
Figure 4:
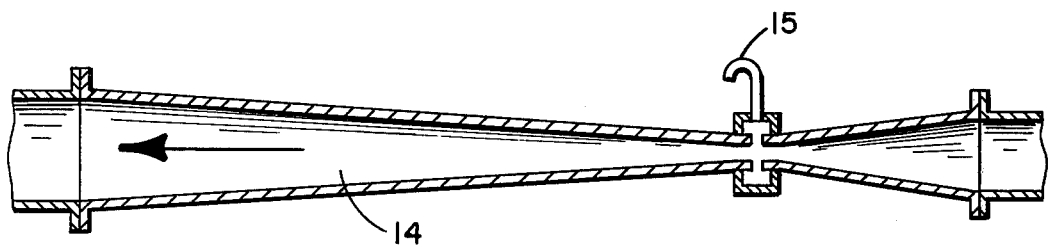
FIG. 4 is a sectional elevation cut on lines 4—4 of FIG. 1.
Figure 5:
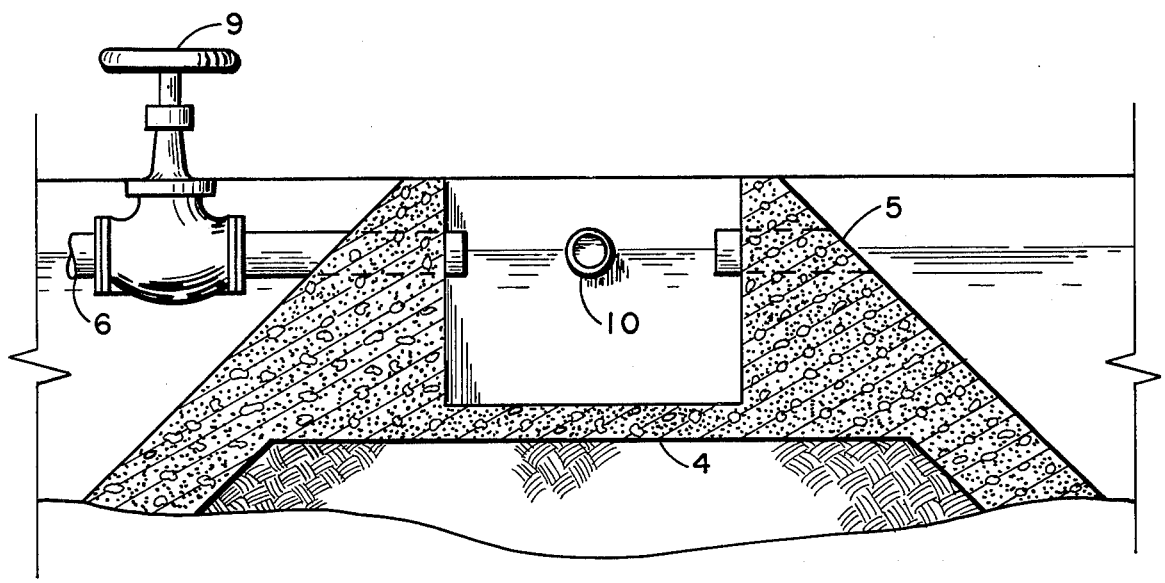
FIG. 5 is a partial sectional elevation cut on lines 5—5 of FIG. 1.
Figure 6:
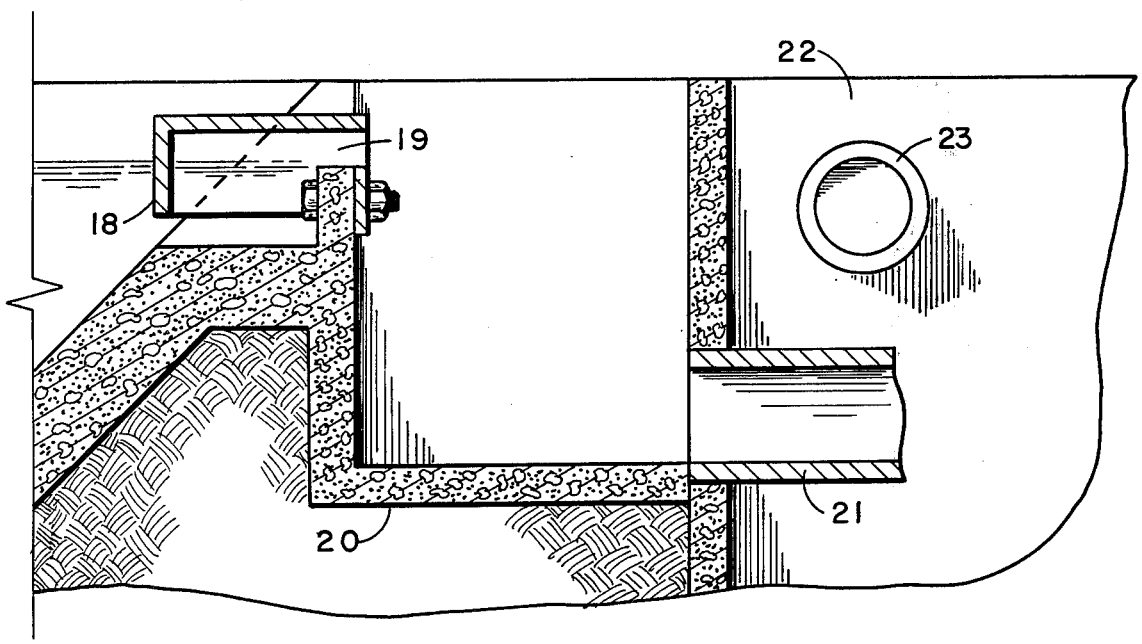
FIG. 6 is a partial sectional elevation cut on lines 6—6 of FIG. 1.

Referring specifically to the drawings, in detail, raw sewage is admitted to the system through the raw sewage inlet 1, into the inlet of the first of any number of influent, recirculation, imperviously lined, aeration channels 2, through which it flows through all such channels connected in series by pipes 3 and from the final influent channel, to the divider box 4 through the inlet pipe 5. From the divider box, a part of the sewage containing activated sludge with aerobic bacteria is diverted to the recirculating sump 12, through the divider box outlet 10 to the recirculating sump controlled by valve 11. The remainder of the sewage reaching the divider box is released to the first of any number of imperviously lined effluent aeration channels 7, through divider box outlet 6 to effluent channels 7, controlled by divider box effluent outlet control valve 9. Effluent aeration channels 7 are connected in series by pipes such as 8. The fluid in the recirculating sump 12 is pumped by the recirculating sump pump 13, through the venturi tube aspirator 14 so that air is aspirated through the aspirator tube 15, the liquid being discharged through the diffuser pipe 16 having circumferentially spaced holes throughout its length through which air is injected into the raw and recirculated sewage. The part of the sewage which leaves the divider box 4 through the pipe 6 and valve 9 into the effluent aeration channels continues to be acted upon by the oxygen, aerobic bacteria, and ultraviolet rays until it reaches the scum skimmer 18 and flows over the discharge weir 19 from the final effluent aeration channel into the discharge trough 20 and out the discharge pipe 21 into natural drainage or into a retention tank reservoir 22, or is returned from the final effluent aeration channel to the recirculation sump through screened opening 17 to dilute the incoming raw sewage along with the seeding aerobic bacteria diverted by the divider box 4. When the discharge pipe 21 discharges into a retention tank reservoir, an overflow pipe 23 discharges into natural drainage if irrigation and lawn sprinklers do not require the entire output of the treatment system. FIG. 2 shows an optional roof covering over aeration channels indicated as 24 which is a greenhouse type roof covering glazed with ultraviolet ray transmitting materials and would be used in cold climates to prevent freezing and interference with oxidation and bacterial action. The recirculating sump 12, divider box 4, and associated parts may be cast in place, precast in concrete, or preformed in plastic or fiberglas reinforced materials and set in place and connected on the side. All parts of the system are susceptible to pre-fabrication and assembly on the side. It is anticipated that, especially in the Great Southwest, the output of the treatment system will not meet irrigation and sprinkler requirements which will have to be met by use of fresh water. The savings in fresh water should, however, be immense.

I claim:

1. An aerobic, aeration, ultraviolet ray, sewage treatment system to be installed in any size or type of housing, single or community, comprising in combination:

a plurality of imperviously lined influent, recirculation, aeration channels, connected in series;

a raw sewage inlet to the first of said influent channels;

a divider box;

an inlet from the final influent channel to said divider box;

a plurality of imperviously lined effluent, aeration channels, connected in series;

an outlet from the divider box to the first of said effluent aeration channels;

a recirculating sump;

an outlet from the divider box to said recirculating sump;

a recirculating sump pump;

a venturi tube aspirator with an aspirator air inlet tube for receiving the discharge from said sump pump and for discharging into the first influent recirculation, aeration channel, to diffuse air and seeding aerobic bacteria into the raw and recirculated sewage;

a screened opening from the final effluent aeration channel into the recirculation sump to dilute the recirculated and raw sewage;

a discharge trough;

an outlet weir to permit the effluent to be discharged from the final effluent channel into said discharge trough;

a scum skimmer for blocking discharge of scum through said outlet weir into said discharge trough; and a discharge pipe from the discharge trough for connection with natural drainage.

2. The system of claim 1 also including: valves in the outlets from the divider box to control the amount of sewage which is permitted to enter the effluent aeration channels and the amount diverted to the recirculation sump.

3. The system of claim 1 also including: greenhouse type roof coverings glazed with ultraviolet ray transmitting materials for said influent and effluent channels where the system is installed in cold climates and freezing and interference with oxidation and bacterial action may occur.

* * * * *